United States Patent
Allen et al.

(10) Patent No.: US 10,788,212 B2
(45) Date of Patent: Sep. 29, 2020

(54) SYSTEM AND METHOD FOR AN OXIDANT PASSAGEWAY IN A GAS TURBINE SYSTEM WITH EXHAUST GAS RECIRCULATION

(71) Applicants: General Electric Company, Schenectady, NY (US); ExxonMobil Upstream Research Company, Houston, TX (US)

(72) Inventors: Jonathan Kay Allen, Simpsonville, SC (US); Jesse Edwin Trout, Simpsonville, SC (US); Ilya Aleksandrovich Slobodyanskiy, Simpsonville, SC (US); Bradford David Borchert, Bellingham, WA (US); Michael V. Kazakis, Roebuck, SC (US); Igor Petrovich Sidko, Moscow (RU)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 729 days.

(21) Appl. No.: 14/992,827

(22) Filed: Jan. 11, 2016

(65) Prior Publication Data

US 2016/0201916 A1 Jul. 14, 2016

Related U.S. Application Data

(60) Provisional application No. 62/102,388, filed on Jan. 12, 2015.

(51) Int. Cl.
*F23R 3/16* (2006.01)
*F23R 3/28* (2006.01)
(Continued)

(52) U.S. Cl.
CPC ............... *F23R 3/16* (2013.01); *F02C 3/04* (2013.01); *F02C 3/20* (2013.01); *F02C 3/34* (2013.01);
(Continued)

(58) Field of Classification Search
CPC ...... F02C 3/34; F02C 3/20; F02C 3/30; F02C 3/60; F02C 7/264; F02C 7/266;
(Continued)

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2645450 9/2007
(Continued)

OTHER PUBLICATIONS

U.S. Appl. No. 14/771,450, filed Feb. 28, 2013, Valeev et al.
(Continued)

*Primary Examiner* — Alain Chau
(74) *Attorney, Agent, or Firm* — Fletcher Yoder, P.C

(57) ABSTRACT

A system includes a turbine combustor. The turbine combustor has a combustor liner disposed about a combustion chamber, a flow sleeve, and a radial passageway. The flow sleeve disposed at an offset about the combustor liner to define a passage, wherein the passage is configured to direct an exhaust gas flow toward a head end of the turbine combustor. The radial passageway extends between the flow sleeve and the combustor liner, and the radial passageway is configured to isolate an oxidant flow through the radial passageway from the exhaust gas flow through the passage for a first operating condition and a second operating con-
(Continued)

dition of the turbine combustor. The offset between the combustor liner and the flow sleeve at the first operating condition is greater than the offset between the combustor liner and the flow sleeve at the second operating condition.

19 Claims, 7 Drawing Sheets

(51) Int. Cl.
    *F02C 3/04*           (2006.01)
    *F02C 3/34*           (2006.01)
    *F23R 3/04*           (2006.01)
    *F23R 3/06*           (2006.01)
    *F23R 3/00*           (2006.01)
    *F02C 3/20*           (2006.01)

(52) U.S. Cl.
    CPC .............. *F23R 3/002* (2013.01); *F23R 3/045* (2013.01); *F23R 3/06* (2013.01); *F23R 3/28* (2013.01); *F23R 2900/00001* (2013.01); *F23R 2900/00005* (2013.01); *F23R 2900/00012* (2013.01); *Y02E 20/16* (2013.01); *Y02T 50/675* (2013.01)

(58) Field of Classification Search
    CPC .... F23R 3/26; F23R 3/04; F23R 3/045; F23R 2900/00001; F23R 2900/00005; F23R 2900/00012; F23R 3/06; F23R 3/002; F23R 3/16; F23R 3/60; F01D 9/065
    See application file for complete search history.

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,841,382 A | 10/1974 | Gravis et al. |
| 3,911,672 A * | 10/1975 | Irwin ...................... F02C 7/266 60/753 |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kicker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,852,355 A * | 8/1989 | Kenworthy ............... F02C 7/18 60/751 |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,144,793 A * | 9/1992 | Able ...................... F23R 3/045 60/757 |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,235,805 A * | 8/1993 | Barbier .................. F23R 3/045 60/39.23 |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |

(56) References Cited

U.S. PATENT DOCUMENTS

| | | | |
|---|---|---|---|
| 5,680,764 A | 10/1997 | Viteri | |
| 5,685,158 A | 11/1997 | Lenahan et al. | |
| 5,687,572 A * | 11/1997 | Schrantz | F23R 3/007 |
| | | | 431/352 |
| 5,709,077 A | 1/1998 | Beichel | |
| 5,713,206 A | 2/1998 | McWhirter et al. | |
| 5,715,673 A | 2/1998 | Beichel | |
| 5,724,805 A | 3/1998 | Golomb et al. | |
| 5,725,054 A | 3/1998 | Shayegi et al. | |
| 5,740,786 A | 4/1998 | Gartner | |
| 5,743,079 A | 4/1998 | Walsh et al. | |
| 5,765,363 A | 6/1998 | Mowill | |
| 5,771,867 A | 6/1998 | Amstutz et al. | |
| 5,771,868 A | 6/1998 | Khair | |
| 5,819,540 A | 10/1998 | Massarani | |
| 5,832,712 A | 11/1998 | Ronning et al. | |
| 5,836,164 A | 11/1998 | Tsukahara et al. | |
| 5,839,283 A | 11/1998 | Dobbeling | |
| 5,850,732 A | 12/1998 | Willis et al. | |
| 5,894,720 A | 4/1999 | Willis et al. | |
| 5,901,547 A | 5/1999 | Smith et al. | |
| 5,924,275 A | 7/1999 | Cohen et al. | |
| 5,930,990 A | 8/1999 | Zachary et al. | |
| 5,937,634 A | 8/1999 | Etheridge et al. | |
| 5,950,417 A | 9/1999 | Robertson et al. | |
| 5,956,937 A | 9/1999 | Beichel | |
| 5,968,349 A | 10/1999 | Duyvesteyn et al. | |
| 5,974,780 A | 11/1999 | Santos | |
| 5,992,388 A | 11/1999 | Seger | |
| 6,016,658 A | 1/2000 | Willis et al. | |
| 6,032,465 A | 3/2000 | Regnier | |
| 6,035,641 A | 3/2000 | Lokhandwala | |
| 6,062,026 A | 5/2000 | Woollenweber et al. | |
| 6,079,974 A | 6/2000 | Thompson | |
| 6,082,093 A | 7/2000 | Greenwood et al. | |
| 6,089,855 A | 7/2000 | Becker et al. | |
| 6,094,916 A | 8/2000 | Puri et al. | |
| 6,101,983 A | 8/2000 | Anand et al. | |
| 6,148,602 A | 11/2000 | Demetri | |
| 6,170,264 B1 | 1/2001 | Viteri et al. | |
| 6,183,241 B1 | 2/2001 | Bohn et al. | |
| 6,201,029 B1 | 3/2001 | Waycuilis | |
| 6,202,400 B1 | 3/2001 | Utamura et al. | |
| 6,202,442 B1 | 3/2001 | Brugerolle | |
| 6,202,574 B1 | 3/2001 | Liljedahl et al. | |
| 6,209,325 B1 | 4/2001 | Alkabie | |
| 6,216,459 B1 | 4/2001 | Daudel et al. | |
| 6,216,549 B1 | 4/2001 | Davis et al. | |
| 6,230,103 B1 | 5/2001 | DeCorso et al. | |
| 6,237,339 B1 | 5/2001 | Åsen et al. | |
| 6,247,315 B1 | 6/2001 | Marin et al. | |
| 6,247,316 B1 | 6/2001 | Viteri | |
| 6,248,794 B1 | 6/2001 | Gieskes | |
| 6,253,555 B1 | 7/2001 | Willis | |
| 6,256,976 B1 | 7/2001 | Kataoka et al. | |
| 6,256,994 B1 | 7/2001 | Dillon, IV | |
| 6,263,659 B1 | 7/2001 | Dillon, IV et al. | |
| 6,266,954 B1 | 7/2001 | McCallum et al. | |
| 6,269,882 B1 | 8/2001 | Wellington et al. | |
| 6,276,171 B1 | 8/2001 | Brugerolle | |
| 6,282,901 B1 | 9/2001 | Marin et al. | |
| 6,283,087 B1 | 9/2001 | Isaksen | |
| 6,289,677 B1 | 9/2001 | Prociw et al. | |
| 6,298,652 B1 | 10/2001 | Mittricker et al. | |
| 6,298,654 B1 | 10/2001 | Vermes et al. | |
| 6,298,664 B1 | 10/2001 | Åsen et al. | |
| 6,301,888 B1 | 10/2001 | Gray | |
| 6,301,889 B1 | 10/2001 | Gladden et al. | |
| 6,305,929 B1 | 10/2001 | Chung et al. | |
| 6,314,721 B1 | 11/2001 | Mathews et al. | |
| 6,324,867 B1 | 12/2001 | Fanning et al. | |
| 6,331,110 B1 * | 12/2001 | Steber | F01D 9/023 |
| | | | 431/10 |
| 6,332,313 B1 | 12/2001 | Willis et al. | |
| 6,345,493 B1 | 2/2002 | Smith et al. | |
| 6,360,528 B1 | 3/2002 | Brausch et al. | |
| 6,363,709 B2 | 4/2002 | Kataoka et al. | |
| 6,367,258 B1 | 4/2002 | Wen et al. | |
| 6,370,870 B1 | 4/2002 | Kamijo et al. | |
| 6,374,591 B1 | 4/2002 | Johnson et al. | |
| 6,374,594 B1 | 4/2002 | Kraft et al. | |
| 6,383,461 B1 | 5/2002 | Lang | |
| 6,389,814 B2 | 5/2002 | Viteri et al. | |
| 6,405,536 B1 | 6/2002 | Ho et al. | |
| 6,412,278 B1 | 7/2002 | Matthews | |
| 6,412,302 B1 | 7/2002 | Foglietta | |
| 6,412,559 B1 | 7/2002 | Gunter et al. | |
| 6,418,725 B1 | 7/2002 | Maeda et al. | |
| 6,429,020 B1 | 8/2002 | Thornton et al. | |
| 6,449,954 B2 | 9/2002 | Bachmann | |
| 6,449,956 B1 | 9/2002 | Kolman et al. | |
| 6,450,256 B2 | 9/2002 | Mones | |
| 6,461,147 B1 | 10/2002 | Sonju et al. | |
| 6,467,270 B2 | 10/2002 | Mulloy et al. | |
| 6,470,682 B2 | 10/2002 | Gray | |
| 6,477,859 B2 | 11/2002 | Wong et al. | |
| 6,484,503 B1 | 11/2002 | Raz | |
| 6,484,505 B1 | 11/2002 | Brown et al. | |
| 6,484,507 B1 | 11/2002 | Pradt | |
| 6,487,863 B1 | 12/2002 | Chen et al. | |
| 6,499,990 B1 | 12/2002 | Zink et al. | |
| 6,499,993 B2 * | 12/2002 | Steber | F01D 9/023 |
| | | | 431/10 |
| 6,502,383 B1 | 1/2003 | Janardan et al. | |
| 6,505,567 B1 | 1/2003 | Anderson et al. | |
| 6,505,683 B2 | 1/2003 | Minkkinen et al. | |
| 6,508,209 B1 | 1/2003 | Collier | |
| 6,523,349 B2 | 2/2003 | Viteri | |
| 6,532,745 B1 | 3/2003 | Neary | |
| 6,539,716 B2 | 4/2003 | Finger et al. | |
| 6,584,775 B1 | 7/2003 | Schneider et al. | |
| 6,598,398 B2 | 7/2003 | Viteri et al. | |
| 6,598,399 B2 | 7/2003 | Liebig | |
| 6,598,402 B2 | 7/2003 | Kataoka et al. | |
| 6,606,861 B2 | 8/2003 | Snyder | |
| 6,612,291 B2 | 9/2003 | Sakamoto | |
| 6,615,576 B2 | 9/2003 | Sheoran et al. | |
| 6,615,589 B2 | 9/2003 | Allam et al. | |
| 6,622,470 B2 | 9/2003 | Viteri et al. | |
| 6,622,645 B2 | 9/2003 | Havlena | |
| 6,637,183 B2 | 10/2003 | Viteri et al. | |
| 6,644,041 B1 | 11/2003 | Eyermann | |
| 6,655,150 B1 | 12/2003 | Åsen et al. | |
| 6,668,541 B2 | 12/2003 | Rice et al. | |
| 6,672,863 B2 | 1/2004 | Doebbeling et al. | |
| 6,675,579 B1 | 1/2004 | Yang | |
| 6,684,643 B2 | 2/2004 | Frutschi | |
| 6,694,735 B2 | 2/2004 | Sumser et al. | |
| 6,698,412 B2 | 3/2004 | Betta | |
| 6,702,570 B2 | 3/2004 | Shah et al. | |
| 6,722,436 B2 | 4/2004 | Krill | |
| 6,725,665 B2 | 4/2004 | Tuschy et al. | |
| 6,731,501 B1 | 5/2004 | Cheng | |
| 6,732,531 B2 | 5/2004 | Dickey | |
| 6,742,506 B1 | 6/2004 | Grandin | |
| 6,743,829 B2 | 6/2004 | Fischer-Calderon et al. | |
| 6,745,573 B2 | 6/2004 | Marin et al. | |
| 6,745,624 B2 | 6/2004 | Porter et al. | |
| 6,748,004 B2 | 6/2004 | Jepson | |
| 6,752,620 B2 | 6/2004 | Heier et al. | |
| 6,767,527 B1 | 7/2004 | Åsen et al. | |
| 6,772,583 B2 | 8/2004 | Bland | |
| 6,790,030 B2 | 9/2004 | Fischer et al. | |
| 6,805,483 B2 | 10/2004 | Tomlinson et al. | |
| 6,810,673 B2 | 11/2004 | Snyder | |
| 6,813,889 B2 | 11/2004 | Inoue et al. | |
| 6,817,187 B2 | 11/2004 | Yu | |
| 6,820,428 B2 | 11/2004 | Wylie | |
| 6,821,501 B2 | 11/2004 | Matzakos et al. | |
| 6,823,852 B2 | 11/2004 | Collier | |
| 6,824,710 B2 | 11/2004 | Viteri et al. | |
| 6,826,912 B2 | 12/2004 | Levy et al. | |
| 6,826,913 B2 | 12/2004 | Wright | |
| 6,838,071 B1 | 1/2005 | Olsvik et al. | |

(56) References Cited

U.S. PATENT DOCUMENTS

| | | | |
|---|---|---|---|
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,920,762 B2 * | 7/2005 | Wells ................ F02C 7/264 |
| | | 60/39.821 |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,000,396 B1 * | 2/2006 | Storey ................ F23R 3/06 |
| | | 60/39.23 |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakia et al. |
| 7,059,133 B2 * | 6/2006 | Gerendas ............ F23R 3/002 |
| | | 60/752 |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |

(56) References Cited

U.S. PATENT DOCUMENTS

| | | |
|---|---|---|
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,171,719 B2 * | 5/2012 | Ryan ...................... F02C 7/264 60/39.821 |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,448,443 B2 | 5/2013 | Berry et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 8,919,137 B2 * | 12/2014 | DiCintio ................ F23R 3/346 60/733 |
| 9,010,082 B2 * | 4/2015 | Stoia ...................... F23R 3/26 60/240 |
| 9,010,120 B2 * | 4/2015 | DiCintio .................. F23R 3/06 60/746 |
| 9,097,424 B2 * | 8/2015 | Chen ...................... F23R 3/045 |
| 9,376,961 B2 * | 6/2016 | Stoia ....................... F02C 6/08 |
| 9,765,698 B2 * | 9/2017 | Bennett .................. F02C 7/28 |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |

(56) References Cited

U.S. PATENT DOCUMENTS

| | | |
|---|---|---|
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235635 A1* | 9/2009 | Ryan ................ F02C 7/264 |
| | | 60/39.821 |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0251723 A1 | 10/2010 | Chen et al. |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0195546 A1* | 8/2013 | Ponziani ................ F23R 3/60 |
| | | 403/327 |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0137567 A1* | 5/2014 | Park ................ F02C 3/14 |
| | | 60/796 |

(56) References Cited

U.S. PATENT DOCUMENTS

| | | | |
|---|---|---|---|
| 2014/0150445 | A1 | 6/2014 | Huntington et al. |
| 2014/0182298 | A1 | 7/2014 | Krull et al. |
| 2014/0182299 | A1 | 7/2014 | Woodall et al. |
| 2014/0182301 | A1 | 7/2014 | Angelyn et al. |
| 2014/0182302 | A1 | 7/2014 | Angelyn et al. |
| 2014/0182303 | A1 | 7/2014 | Angelyn et al. |
| 2014/0182304 | A1 | 7/2014 | Angelyn et al. |
| 2014/0182305 | A1 | 7/2014 | Angelyn et al. |
| 2014/0196464 | A1 | 7/2014 | Biyani et al. |
| 2014/0216011 | A1 | 8/2014 | Muthaiah et al. |
| 2015/0000292 | A1 | 1/2015 | Subramaniyan |
| 2015/0000293 | A1 | 1/2015 | Thatcher et al. |
| 2015/0000294 | A1 | 1/2015 | Minto et al. |
| 2015/0000299 | A1 | 1/2015 | Zuo et al. |
| 2015/0033748 | A1 | 2/2015 | Vaezi |
| 2015/0033749 | A1 | 2/2015 | Slobodyanskiy et al. |
| 2015/0033751 | A1 | 2/2015 | Andrew |
| 2015/0033757 | A1 | 2/2015 | White et al. |
| 2015/0040574 | A1 | 2/2015 | Wichmann et al. |
| 2015/0059350 | A1 | 3/2015 | Kolvick et al. |
| 2015/0075171 | A1 | 3/2015 | Sokolov et al. |
| 2015/0152791 | A1 | 6/2015 | White |
| 2015/0198089 | A1 | 7/2015 | Muthaiah et al. |
| 2015/0204239 | A1 | 7/2015 | Minto et al. |
| 2015/0214879 | A1 | 7/2015 | Huntington et al. |
| 2015/0226133 | A1 | 8/2015 | Minto et al. |
| 2015/0308293 | A1 | 10/2015 | Huntington et al. |
| 2015/0330252 | A1 | 11/2015 | Manchikanti et al. |
| 2015/0377140 | A1 | 12/2015 | Rittenhouse et al. |
| 2015/0377146 | A1 | 12/2015 | Della-Fera et al. |
| 2015/0377148 | A1 | 12/2015 | Minto et al. |

FOREIGN PATENT DOCUMENTS

| | | |
|---|---|---|
| CN | 203907670 U | 10/2014 |
| EP | 0770771 | 5/1997 |
| EP | 2554906 A2 | 2/2013 |
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |
| WO | WO2014071118 | 5/2014 |
| WO | WO2014071215 | 5/2014 |
| WO | WO2014133406 | 9/2014 |

OTHER PUBLICATIONS

U.S. Appl. No. 14/599,750, filed Jan. 19, 2015, O'Dea et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre- and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 ( 21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.
Reeves, S. R. (2001) "Geological Sequestration of $CO_2$ in Deep, Unmineable Coalbeds: An Integrated Research and Commercial-

(56) References Cited

OTHER PUBLICATIONS

Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown, WV; NASA Glenn Research Center (US), 7 pgs.
Rosetta, M. J. et al. (2006) "Integrating Ambient Air Vaporization Technology with Waste Heat Recovery—a Fresh Approach to LNG Vaporization," presented at the 85th annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the 16th IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.
PCT Notice of Invitation to Pay Additional Fees; Application No. PCT/US2016/013071; dated Mar. 21, 2016; 7 pages.
PCT International Search Report and Written Opinion; Application No. PCT/US2016/013071; dated May 30, 2016; 17 pages.
CN First Office Action for Application No. 201680014833.0 dated Jun. 4, 2019, pp. 1-9.
Japanese Office Action for JP Application No. 2017-555450, dated Nov. 18, 2019, 16 pgs.

\* cited by examiner

SYSTEM AND METHOD FOR AN OXIDANT PASSAGEWAY IN A GAS TURBINE SYSTEM WITH EXHAUST GAS RECIRCULATION

CROSS-REFERENCE TO RELATED APPLICATION

This application claims priority to and benefit of U.S. Provisional Patent Application No. 62/102,388, entitled "SYSTEM AND METHOD FOR AN OXIDANT PASSAGEWAY IN A GAS TURBINE SYSTEM WITH EXHAUST GAS RECIRCULATION," filed on Jan. 12, 2015, which is incorporated by reference herein in its entirety for all purposes.

BACKGROUND

The subject matter disclosed herein relates to gas turbine systems and, more specifically, to gas turbine systems with exhaust gas recirculation.

Gas turbine engines are used in a wide variety of applications, such as power generation, aircraft, and various machinery. Gas turbine engine generally combust a fuel with an oxidant (e.g., air) in a combustor section to generate hot combustion products, which then drive one or more turbine stages of a turbine section. In turn, the turbine section drives one or more compressor stages of a compressor section, thereby compressing oxidant for intake into the combustor section along with the fuel. Again, the fuel and oxidant mix in the combustor section, and then combust to produce the hot combustion products. These combustion products may include unburnt fuel, residual oxidant, and various emissions (e.g., nitrogen oxides) depending on the conditions of combustion. Furthermore, gas turbine engines typically consume a vast amount of air as the oxidant, and output a considerable amount of exhaust gas into the atmosphere. In other words, the exhaust gas is typically wasted as a byproduct of the gas turbine operation.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system having a turbine combustor is provided. The turbine combustor has a combustor liner disposed about a combustion chamber, a flow sleeve, and a radial passageway. The flow sleeve disposed at an offset about the combustor liner to define a passage, wherein the passage is configured to direct an exhaust gas flow toward a head end of the turbine combustor. The radial passageway extends between the flow sleeve and the combustor liner, and the radial passageway is configured to isolate an oxidant flow through the radial passageway from the exhaust gas flow through the passage for a first operating condition and a second operating condition of the turbine combustor. The offset between the combustor liner and the flow sleeve at the first operating condition is greater than the offset between the combustor liner and the flow sleeve at the second operating condition.

In another embodiment, a system is provided. The system includes a thimble system configured to mount in a passage between a combustor liner and a flow sleeve of a turbine combustor of a gas turbine engine. The thimble system comprises at least one sleeve having an oxidant passage, and the at least one sleeve is configured to move between the combustor liner and the flow sleeve to block fluid communication between the oxidant passage and the passage.

In another embodiment, a method is provided. The method includes adjustably routing an oxidant through an oxidant passage in a thimble system disposed in a passage between a combustor liner and a flow sleeve of a turbine combustor of a gas turbine engine. Adjustably routing comprises selectively moving at least one sleeve of the thimble system between the combustor liner and the flow sleeve while blocking fluid communication between the oxidant passage and the passage.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
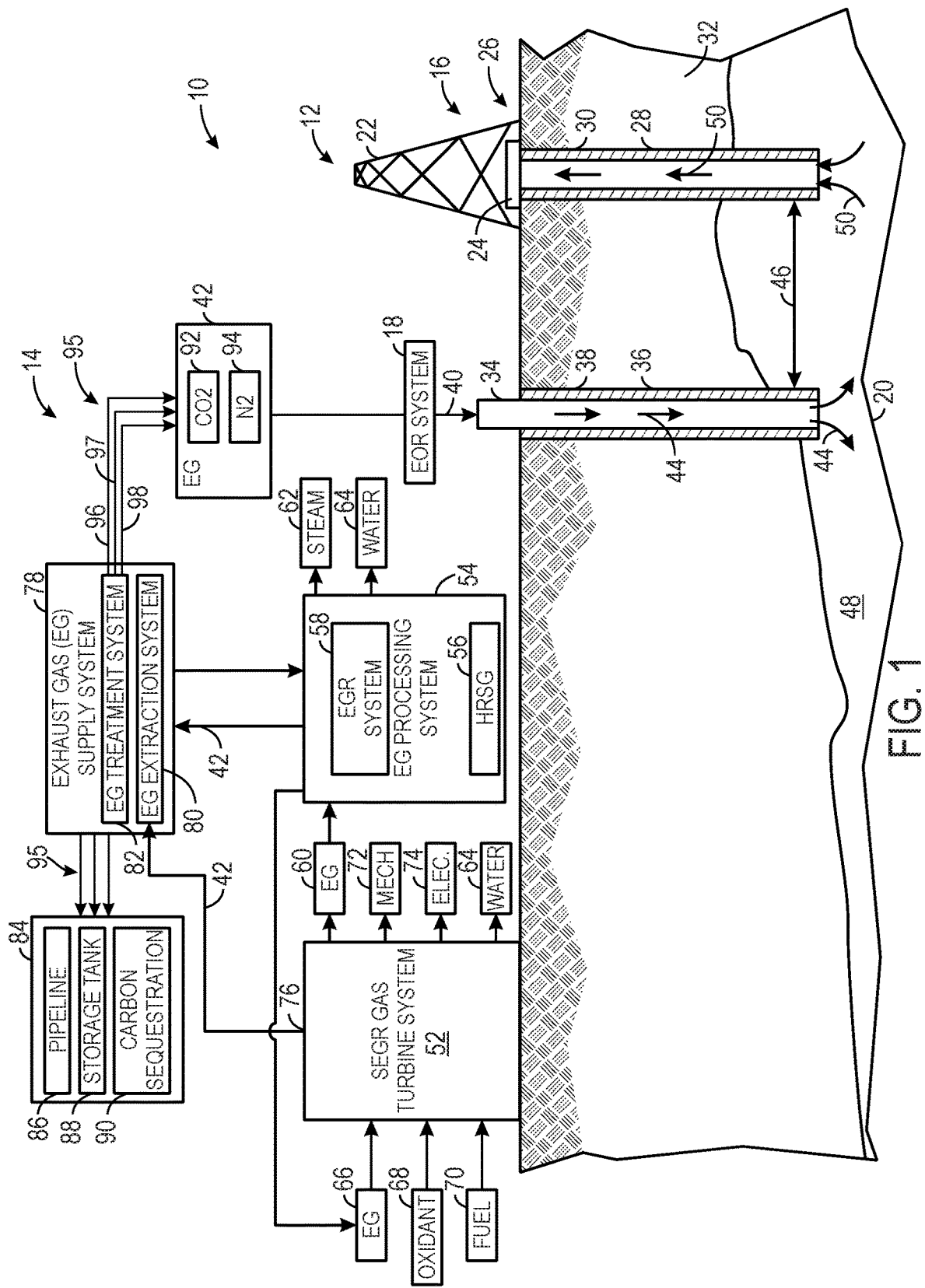
FIG. 1 is a diagram of an embodiment of a system having a turbine-based service system coupled to a hydrocarbon production system.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. The recirculation of the exhaust gas along with stoichiometric combustion may help to increase the concentration level of carbon dioxide ($CO_2$) in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units). Furthermore, the gas turbine engines may be configured to combust the fuel and oxidant with one or more diffusion flames (e.g., using diffusion fuel nozzles), premix flames (e.g., using premix fuel nozzles), or any combination thereof. In certain embodiments, the diffusion flames may help to maintain stability and operation within certain limits for stoichiometric combustion, which in turn helps to increase production of $CO_2$. For example, a gas turbine system operating with diffusion flames may enable a greater quantity of EGR, as compared to a gas turbine system operating with premix flames. In turn, the increased quantity of EGR helps to increase $CO_2$ production. Possible target systems include pipelines, storage tanks, carbon sequestration systems, and hydrocarbon production systems, such as enhanced oil recovery (EOR) systems.

Some embodiments of a stoichiometric exhaust gas recirculation (SEGR) gas turbine system, as described below, may supply the oxidant and the fuel into a combustion chamber from a head end portion of a combustor. Further, the SEGR gas turbine system may separately supply an inert gas (e.g., exhaust gas) to the combustor at an opposite turbine end portion of the combustor to cool the combustor liner and combustion gases within the combustion chamber. For example, a flow sleeve (e.g., intermediate wall) forms a passage about a combustor liner that enables the inert gas (e.g., the exhaust gas) to flow along the outside of the combustion chamber. The passage may be open to the head end portion. In some embodiments, a portion of the oxidant enters an oxidant section in the downstream direction relative to the combustion gases from the head end portion. The oxidant section may be disposed at least partially about (e.g., radially outside) the combustor liner and the passage with the inert gas. The inert gas (e.g., exhaust gas) enters a cooling section of the passage in an upstream direction relative to the combustion gases from the turbine end portion of the combustor. Generally, it may be beneficial to reduce the amount of mixing and interaction between the opposing flows (e.g., oxidant in the downstream direction of the oxidant section, inert gas in the upstream direction of the passage) to maintain the reduced oxidant composition of the inert gas.

Accordingly, in certain SEGR gas turbine systems, one or more thimble systems may be provided to direct and route the oxidant flowing in the downstream direction from the oxidant section and into the combustion chamber of the combustor. In particular, the thimble system may include an oxidant passageway that directs the oxidant from the oxidant section, through the inert gas passage and the combustor liner, and into the combustion chamber of the combustor. However, in certain embodiments, the thimble system may include a gap within the oxidant section open to the passage (e.g., intermediate space) for the inert gas that is between the combustor liner and the flow sleeve. The gap may facilitate the installation between the flow sleeve and the combustor liner. However, without the disclosed embodiments, the gap within the thimble system may allow undesirable mixing between a portion of the oxidant and the inert gas within the passage. Accordingly, features of the present disclosure provide embodiments of a thimble system to eliminate a gap between the flow sleeve and the combustor liner that is open to the passage with the inert gas. In certain embodiments, the thimble system is a spring-loaded thimble system that may be installed between the combustor liner and the flow sleeve via one or more ramps, as further described below with respect to FIG. 7. In certain embodiments, the thimble system is a mechanically-loaded thimble system that may be installed between the combustor liner and the flow sleeve via a floating collar system, as further described with respect to FIG. 8.

In some embodiments, the combustor may have differentially supplied and controlled sets of fuel nozzles to inject the oxidant and one or more fuels into the combustion chamber. In some embodiments, the oxidant is concentrated near the flame zone to increase the efficiency of combustion, thereby affecting the equivalence ratio. Adjusting the equivalence ratio to approximately 1.0 (e.g., between 0.95 and 1.05) may reduce the concentrations of oxidant, fuel, and/or other components (e.g., nitrogen oxides, water) within the exhaust gases of the SEGR gas turbine system. However, the combustion temperature also may be greater at an equivalence ratio at or near 1.0 (e.g., substantially stoichiometric combustion). The greater combustion temperature may create greater emissions, such as nitrogen oxide ($NO_x$) emissions. The inert gas (e.g., exhaust gas) may be a heat sink for the combustor and/or combustion gases. In other words, the inert gas (e.g., exhaust gas) may help to reduce the temperature of combustion gases, thereby reducing the NO emissions without introducing more oxidant (e.g., oxygen) into the combustion gases. In some embodiments, adjusting the equivalence ratio to approximately 1.0 may increase the concentration of carbon dioxide that may be utilized in an enhanced oil recovery system, while the use of exhaust gas as the diluent maintains low levels of NOR, oxygen, and fuel in the combustion gases. The exhaust gas, or the carbon dioxide extracted from the exhaust gas, may be utilized by a fluid injection system for enhanced oil recovery.

FIG. 1 is a diagram of an embodiment of a system 10 having a hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_x$, CO, $SO_x$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_x$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and an $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_x$), carbon monoxide (CO), sulfur oxides (e.g., $SO_x$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the oxidant 68, and fuel 70 flow through the head end portion (e.g., through fuel nozzles) into the combustion portion (e.g., combustion chamber) of each combustor and the exhaust gas 66 flows into the same combustion portion of each chamber, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

Figure 2:
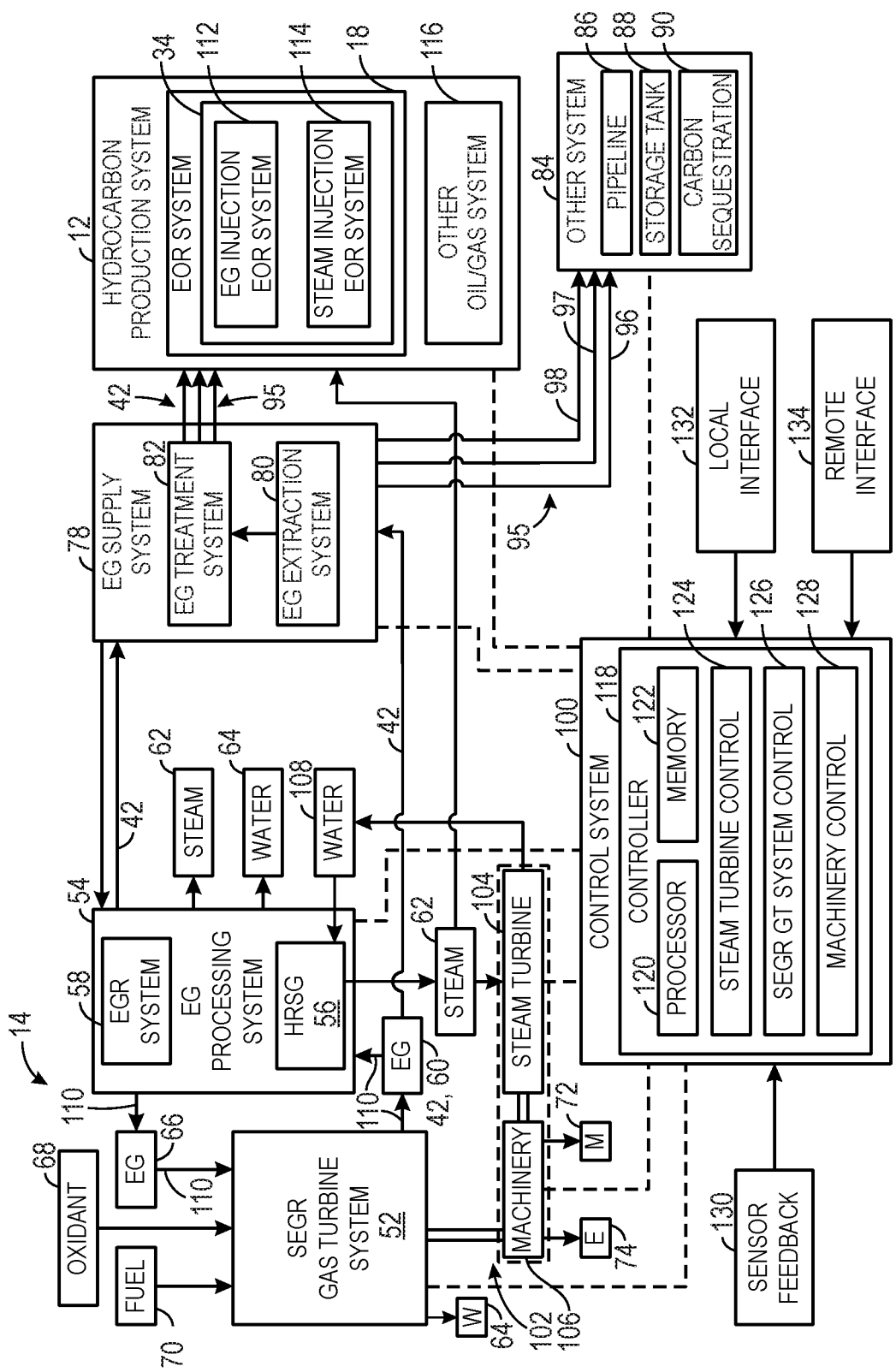
FIG. 2 is a diagram of an embodiment of the system of FIG. 1, further illustrating a control system and a combined cycle system.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_x$ sensors), carbon oxides (e.g., CO sensors and $CO_2$ sensors), sulfur oxides (e.g., $SO_x$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

Figure 3:
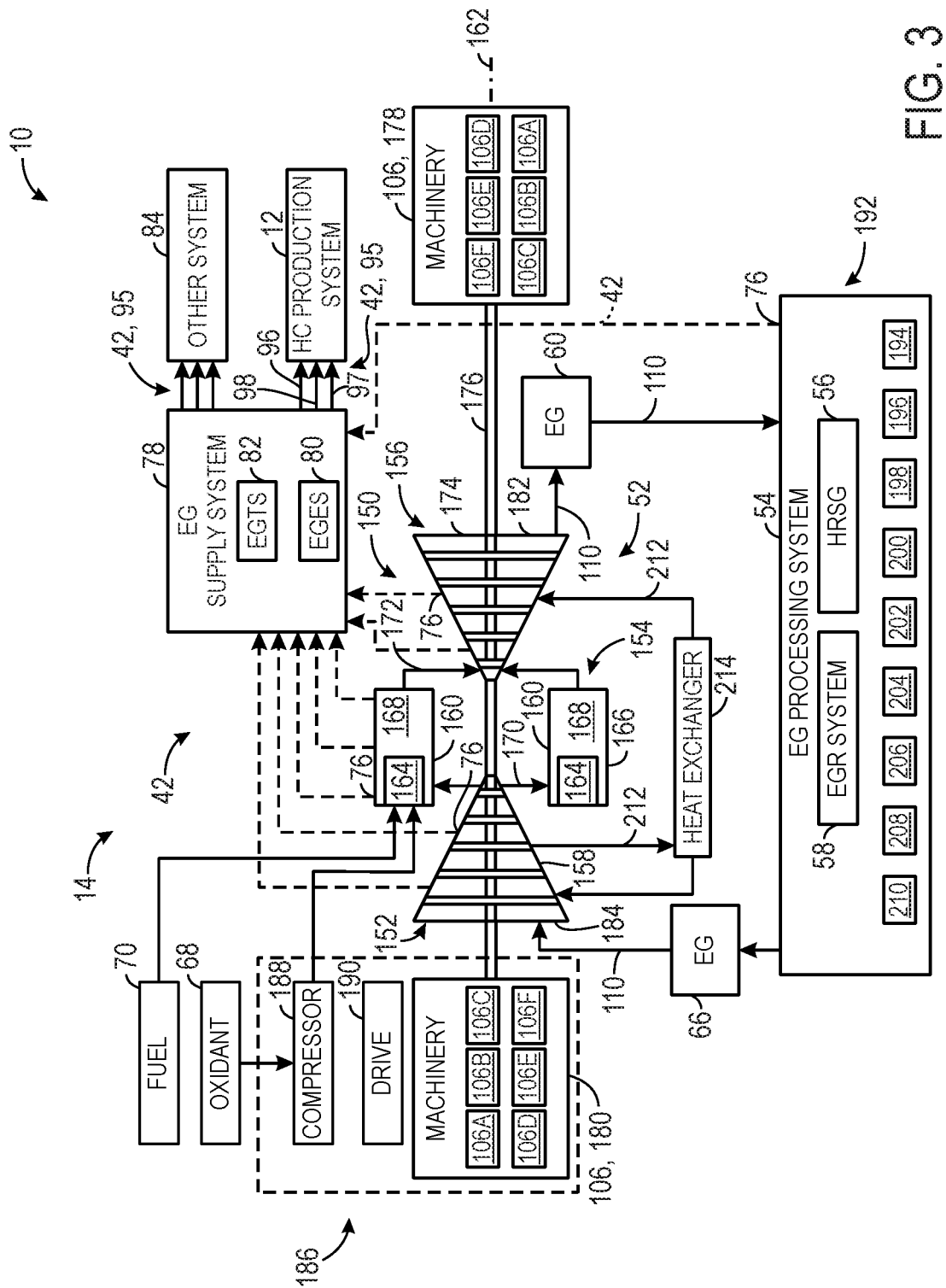
FIG. 3 is a diagram of an embodiment of the system of FIGS. 1 and 2, further illustrating details of a gas turbine engine, exhaust gas supply system, and exhaust gas processing system.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_x$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_x$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_x$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP MOC | GBX CLR | LP MOC | GEN | | |
| HP MOC | GBX CLR | LP MOC | GBX | GEN | |
| HP MOC | GBX HTR STGN | LP MOC | GEN | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location.

202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200,

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
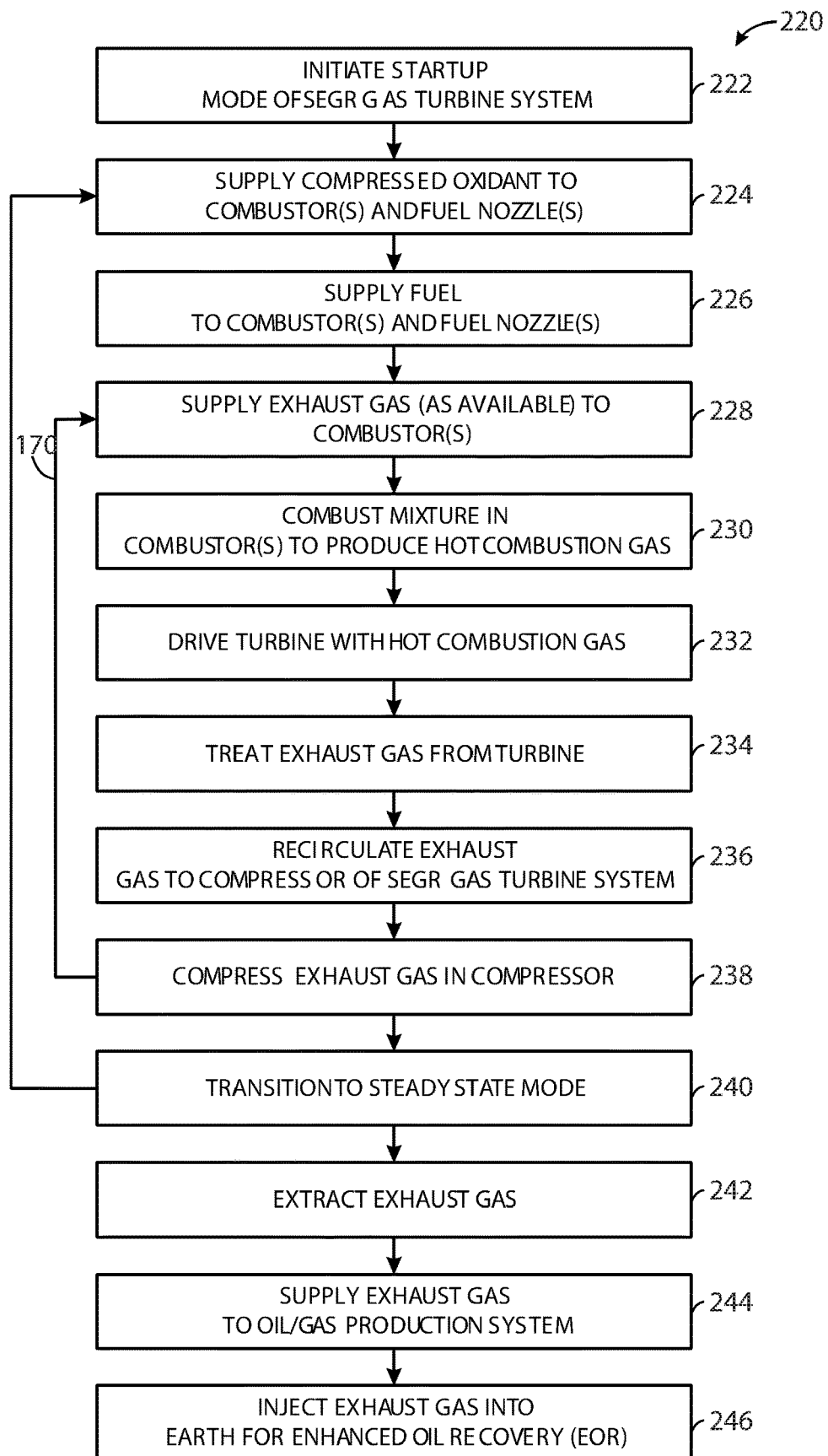
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230 by the one or more diffusion flames, premix flames, or a combination of diffusion and premix flames. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

Figure 5:
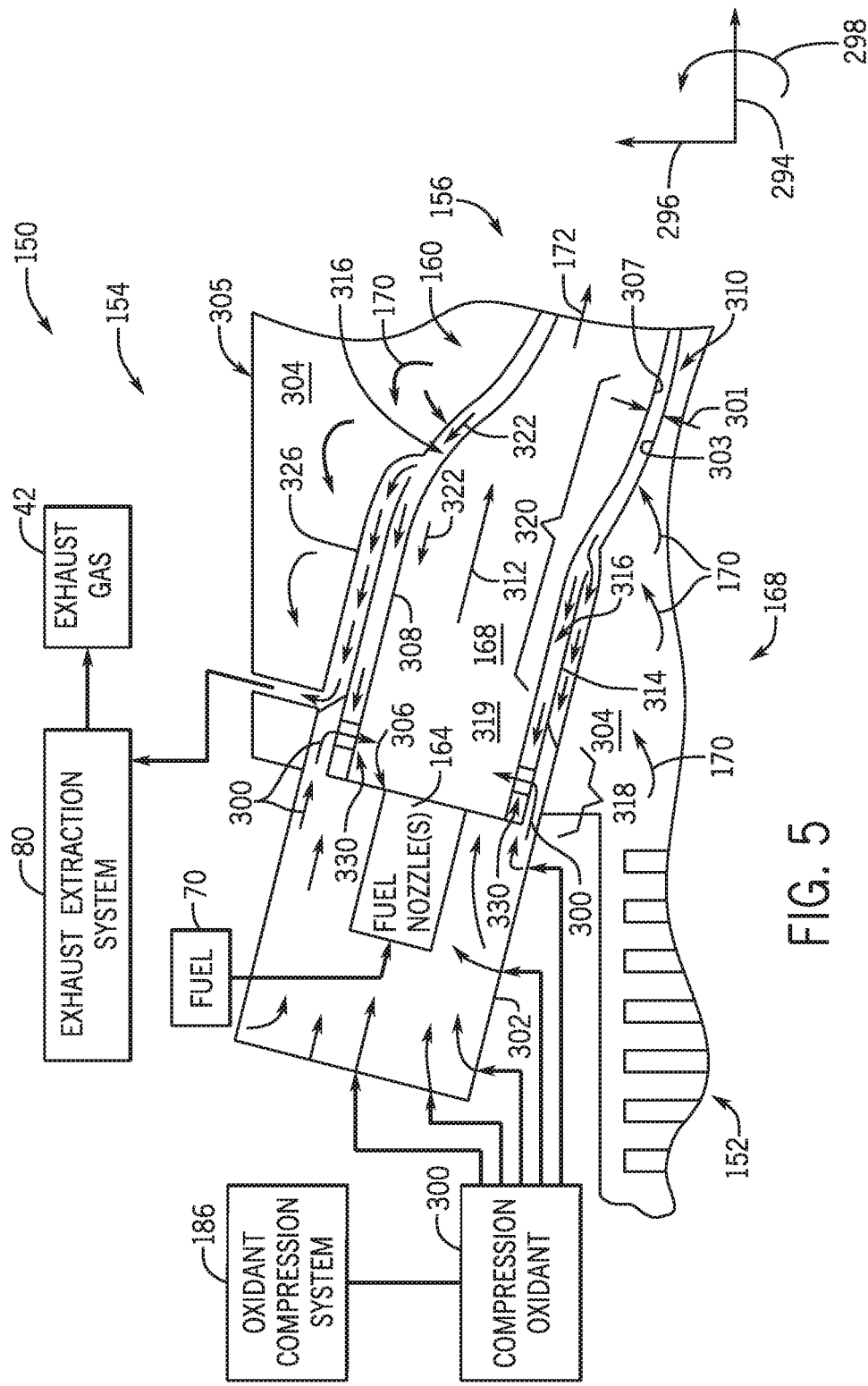
FIG. 5 is a schematic diagram of an embodiment of a combustor portion of a gas turbine engine with exhaust gas recirculation and a flexible thimble system disposed between a flow sleeve and a liner.

In some embodiments of the SEGR gas turbine system 52, the exhaust gas 42 is recirculated and used to cool the combustor section 154 of the gas turbine engine 150. FIG. 5 is a schematic diagram of the combustor section 154 that includes various features that are shown in detail in FIG. 6-8. Elements in FIG. 5 in common with those shown in previous figures are labeled with the same reference numerals. The axial direction of the combustor 160 is indicated by arrow 294, the radial direction is indicated by arrow 296, and the circumferential direction is indicated by arrow 298.

As illustrated in FIG. 5, the oxidant compression system 186 generates a compressed oxidant 300 that may be provided to various locations at a head end portion 302 of the combustor 160. Fuel 70 is provided to the one or more fuel nozzles 164 in the head end portion 302 of the turbine combustor 160. As discussed above, the oxidant 300 and fuel 70 may be mixed prior to injection into the combustor 160 via one or more premix fuel nozzles, mixed in the combustion chamber 160 via one or more diffusion flame nozzles, or any combination thereof. Thus, the fuel nozzles 164 may be diffusion nozzles, pre-mix fuel nozzles, or any combination thereof. The compressed oxidant 300 may include air, oxygen, oxygen-enriched air, oxygen-reduced air, or oxygen nitrogen mixtures. In some embodiments, the compressed oxidant 300 may have a concentration of the exhaust gas 42 of less than approximately 10 percent, 5 percent, or 1 percent by volume.

As discussed above, a SEGR gas turbine system 52 may recirculate a portion of the exhaust gas 42 (e.g., compressed exhaust gas 170) through the compressor section 152 and at least part of the combustor section 154 (e.g., one or more combustors 160). In some of the embodiments discussed below, an inert gas or substantially inert gas 304 (e.g., exhaust gas 42) do not recirculate through the head end portion 302 of the combustor 160. The compressed exhaust gas 170 and/or the relatively inert gas 304 from the compressor section 152 may be supplied to a turbine end portion 310 of the combustor 160 rather than directly to the head end portion 302, thus helping to maintain isolation between the oxidant 300 and the inert gas 304. In some embodiments, the inert gas 304 (e.g., exhaust gas 42) may have less than approximately 10 percent, 5 percent, or 1 percent or less by volume of oxidant 300 (e.g., oxygen ($O_2$)). One or more fuels 70 may be supplied to the fuel nozzles 164. For example, the fuel 70 may include, but is not limited to, a gaseous fuel (e.g., natural gas, process gas, methane, hydrogen, carbon monoxide), a liquid fuel (e.g., light distillates, kerosene, heating oil), or any combination thereof.

The compressor section 152 supplies the inert gas 304 (e.g., exhaust gas 42) to a compressor discharge casing 305, which encloses at least part of the combustor 160 of the combustor section 154 (e.g., the combustion chamber 168). The inert gas 304 may be substantially inert (e.g., unreactive) relative to the oxidant 300. The combustion chamber 168 is partially enclosed by a combustor cap 306 of the head end portion 302, and a combustor liner 308 (e.g., inner wall) along the axis 294 of the combustor 160. The combustor liner 308 extends in the circumferential direction 298 around the combustion chamber 168. The turbine end portion 310 of the combustor 160 guides the combustion gases 172 from combustion of the oxidant 300 and the fuel 70 in the downstream direction 312 to the turbine section 156. In some embodiments, the combustion gases 172 that exit the combustor 160 may be substantially free of oxidant 300 and fuel 70, with a concentration of less than approximately 10, 5, 3, 2, or 1 percent by volume of oxidant 300 and fuel 70. A flow sleeve 314 (e.g., intermediate wall) forms a passage 316 about the combustor liner 308 that enables a fluid (e.g., inert gas 304 such as exhaust gas 170) to flow along the outside of the combustion chamber 168. The passage 316 extends in the circumferential direction 298 around the combustor liner 308, and the flow sleeve 314 extends in the circumferential direction 298 around the passage 316. In some embodiments, the inert gas 304 is a primary cooling media for the combustion chamber 168 and/or a heat sink for the combustion gases 172.

In some embodiments, an extraction sleeve 326 extends circumferentially 298 around at least part of the flow sleeve 314 and combustor liner 308. The extraction sleeve 326 is in fluid communication with the flow sleeve 314, thereby enabling some of the inert gas 304 (e.g., compressed exhaust gas 170) in the flow sleeve 314 to be extracted to an exhaust extraction system 80. The inert gas 304 may be bled into the extraction sleeve 326 to control the flow rate of the inert gas 304 within the passage 316. As described in some embodiments above, the compressed exhaust gas 170 may be recirculated through the SEGR gas turbine system 52 and/or may be utilized by a fluid injection system 36 for enhanced oil recovery.

In some embodiments, the compressed oxidant 300 is provided at the head end portion 302 of the combustor 160, routed through the combustion cap 306, and directed into the combustor liner 308. Additionally, or in the alternative, a portion of the oxidant 300 is routed outside of the combustion cap 306 and into a region around the flow sleeve 314. This portion of the oxidant 300 may be configured to enter the combustion chamber 168 via one or more mixing holes 332, as further described with respect to FIG. 6. In particular, the oxidant 300 routed around the flow sleeve 314 may enter an oxidant section 318 around the flow sleeve 314, and flow into a fuel-oxidant mixing region 319 of the combustion chamber 168 downstream of the fuel nozzles 164. The oxidant 300 directed into the combustion chamber 168 may flow in the downstream direction 312 with the combustion gases 172 from the head end portion 302 toward the turbine section 156. The inert gas 304 (e.g., exhaust gas 170) enters a cooling section 320 of the passage 316 in an upstream direction 322. A portion of the inert gas 304 in the passage may enter the combustion chamber 168 in the cooling section 320, thereby cooling the combustor liner 308 and the combustion gases 172 flowing in the downstream direction 312. The passage 316 and the inert gas 304 may terminate at the combustor cap 306. In certain embodiments, a thimble system 330 may be disposed between the flow sleeve 314 and the combustor liner 308 proximate to the oxidant section 318. In particular, the thimble system 330 may be configured to route and direct the oxidant 300 from the oxidant section 318 to the oxidant mixing region 319 of the combustion chamber 168 (e.g., through the flow sleeve 314 and through the combustor liner 308). In particular, the oxidant 300 may be routed through the oxidant passageway 334 (e.g., conduit), and the oxidant passageway 334 may block exposure and mixing between the oxidant 300 and inert gas 304 in the passage 316 (e.g., intermediate space between the flow sleeve 314 and the combustor liner 308). That is, the oxidant passageway 334 may not be in fluid communication with the inert gas 304 of the passage 316. In this manner, the thimble system 330 may be configured to reduce mixing between the oxidant 300 and the inert gas 304 within the passage 316. In particular, the thimble system 330 may not have any radial gaps within the oxidant passageway 334 (e.g., conduit) that are opened to the passage 316. Instead, the thimble system 330 may provide a continuous oxidant passageway 334 for the oxidant 300 to be routed into the combustion chamber 168 without any mixing and/or interaction between the oxidant 300 and the inert gas 304 within the passage 316.

In certain embodiments, the thimble system 330 may be a flexible system (e.g., flexible, resilient, expandable, and/or contractible conduit) that allows some movement and flexibility along the axial direction 294 and the radial direction 296. In particular, an offset distance 301 between the flow sleeve 314 and the combustor liner 308 may define the radial length of the passage 316. For example, the offset distance 301 is the distance between the interior surface 303 of the flow sleeve 314 and the outer surface 307 of the combustor liner 308. Specifically, the offset distance 301 may facilitate the installation of the combustor liner 308 into the flow sleeve 314 when the combustor 160 is assembled. Further, during operation of the combustor 160, high temperatures and pressures within the combustion chamber 168 may expand portions of the flow sleeve 314 and combustor liner 308 in the radial direction 296, thereby causing slight radial adjustments in the offset distance 301 between the combustor liner 308 and the flow sleeve 314. For example, the variations in the offset distance 301 between the combustor liner 308 and the flow sleeve 314 may vary between approximately 5% to 15% of the total offset distance 301. In certain embodiments, the variations in the offset distance 301 may vary between approximately 1% to 20% of the offset distance 301. Accordingly, the thimble system 330 may be flexible (e.g., expand and/or contract) enough to move in the radial direction 296 along with the expanded portions of the flow sleeve 314 and/or the combustor liner 308, if necessary. In some situations, vibrations of the combustion chamber 168 during operation of the combustor 160 may also cause movement in the axial direction 294 and/or the radial direction 296. In these situations, the thimble system 330 may be flexible enough to move (e.g., laterally bend, flex, or geometrically adjust) in the axial direction 294 along with components of the combustor 160 (e.g., the flow sleeve 314 and/or the combustor liner 308). Accordingly, features of the thimble system 330 may allow for some movement in the axial direction 294 or the radial direction 296 during operation of the combustor 160 without mixing the oxidant 300 and the inert gas 304 within the passage 316, as further described with respect to FIGS. 7 and 8. In certain embodiments, features of the thimble system 330 may additionally allow for some movement in the circumferential direction 298.

Figure 6:
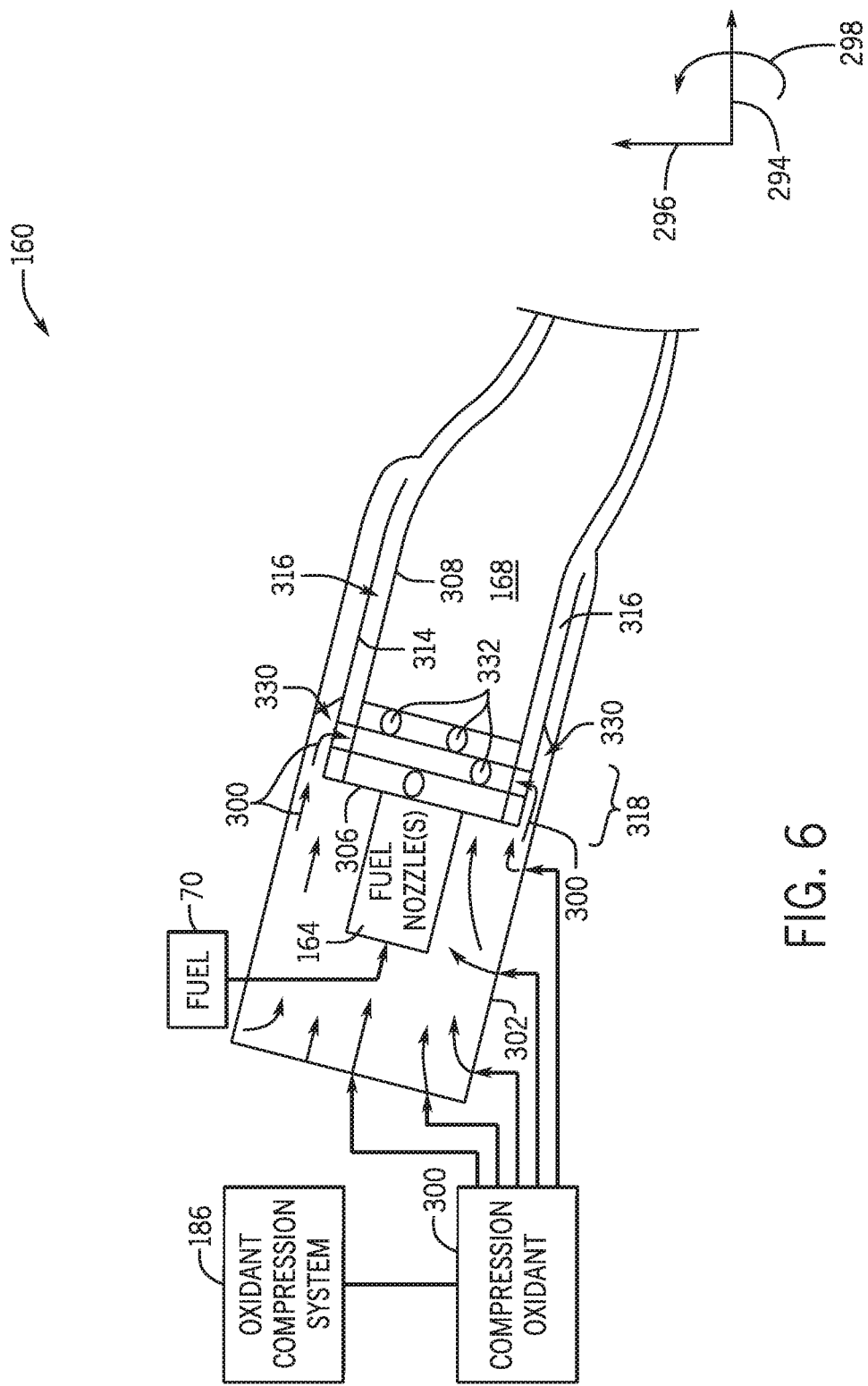
FIG. 6 is a schematic diagram of an embodiment of a combustion portion of the gas turbine engine of FIG. 5, illustrating the flexible thimble system in alignment with one or more mixing holes.

FIG. 6 is a schematic diagram of an embodiment of a combustion portion 168 of the gas turbine engine of FIG. 5, illustrating one or more thimble systems 330 in alignment with one or more mixing holes 332. As noted above, the oxidant 300 and fuel 70 are supplied to the head end portion 302 and fuel nozzles 164. Further, a portion of the oxidant 300 may be routed from the head end portion 302, to the oxidant section 318 of the combustor 160, and through one or more mixing holes 332. As noted above, the oxidant section 318 may be disposed around the flow sleeve 314 downstream of the combustion cap 306.

In certain embodiments, one or more mixing holes 332 may direct the oxidant 300 from the oxidant section 318 into the combustion chamber 168 to mix and/or combust (e.g., uniformly mix) the oxidant 300 and fuel 70 from the fuel nozzles 164, to stabilize a flame (e.g., diffusion flame and/or premix flame) from the one or more fuel nozzles 164, and/or to shape the flame 348 within the combustion chamber 168. In some embodiments, the combustor liner 308 may have one or more rows of mixing holes 332 proximate to the head end portion 302. In particular, each mixing hole 332 may be associated with a particular fuel nozzle 164, such that the oxidant 300 is aligned with that particular fuel nozzle 164. For example, in certain embodiments, the combustor liner 308 may have a single row of M mixing holes 332 that are each associated with one of M fuel nozzles 164, wherein M is greater than or equal to 1, 2, 3, 4, 5, 6, or more. As a further example, the combustor liner 308 may include R rows of mixing holes 332, with M mixing holes 332 in each row, wherein R is greater than or equal to 2, 3, 4, 5, or more.

It should be noted that the combustor 160 may include any number of mixing holes 332 (e.g., 1, 2, 3, 4, 5, 6, 7, 8, 9, 10, or more) within any number of rows (e.g., 1, 2, 3, 4, 5, 6, or more) in the oxidant mixing region 319. The mixing holes 332 may be staggered or aligned in the axial direction 298. As a further example, in certain embodiments, the combustor liner 308 may have approximately 1 to 1000, 1 to 500, 1 to 100, 1 to 10, or any other number of rows of mixing holes 332 about the combustor liner 308, wherein each row may include approximately 1 to 1000 or more holes 332. In some embodiments, the mixing holes 332 are symmetrically spaced about the combustor liner 308. In some embodiments, the position, shape, and/or size of the mixing holes 332 may differ based at least in part on spacing from the combustor cap 306. The shape of the mixing holes 332 may include, but is not limited to, circles, slots, or chevrons, or any combination thereof.

In certain embodiments, each mixing hole 332 may be associated with a particular thimble system 330. For example, each thimble system 330 may be aligned with a particular mixing hole 332. The mixing hole 332 may be configured to route the oxidant 300 through the flow sleeve 314, through the passage 316, through the combustor liner 308, and into the combustion chamber 168. As noted above, each of the one or more thimble systems 330 (disposed between the flow sleeve 314 and the combustor liner 308) may be aligned and/or disposed within a particular mixing hole 332. The thimble system 330 may include a continuous oxidant passageway 334 (e.g., flexible conduit) that routes the oxidant 300 from the oxidant section 318 and through the passage 316 without interacting and/or mixing with the inert gas 304. Indeed, it may be beneficial for each mixing hole 332 associated with the fuel nozzle 164 and configured to receive the oxidant 300 from the oxidant section 318 to include the thimble system 330, such that the oxidant 300 has the oxidant passageway 334 that is configured to route the oxidant 300 through the passage 316 without mixing with the inert gas 304 within the passage 316.

Figure 7:
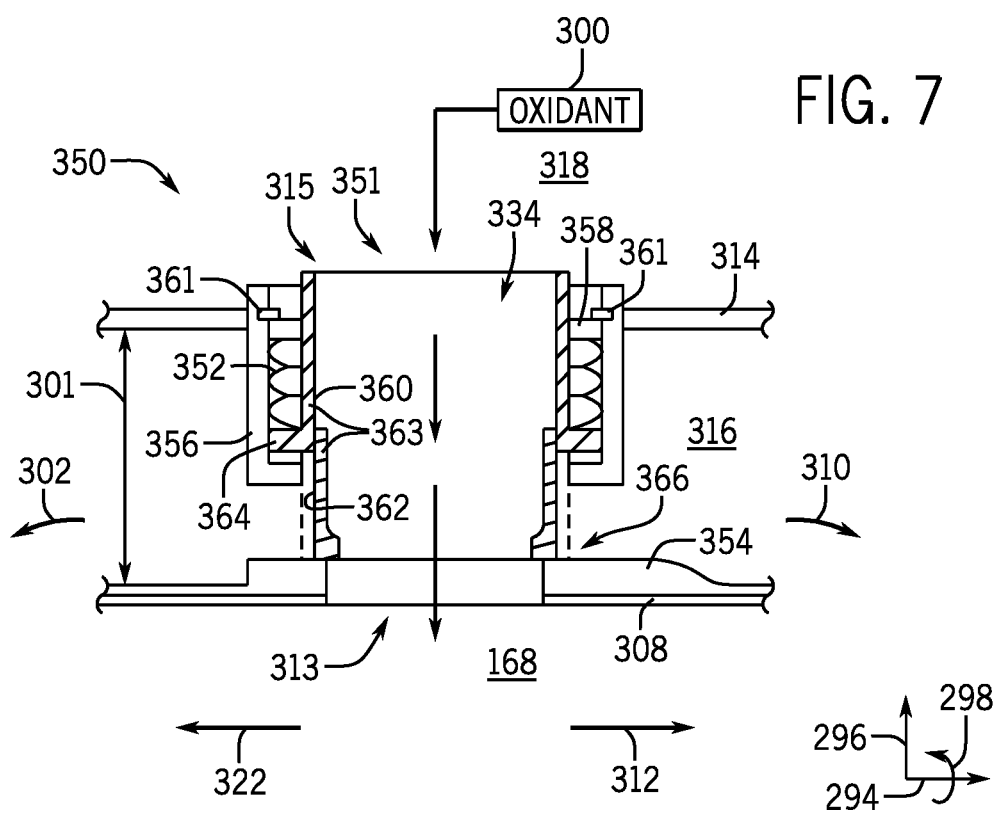
FIG. 7 is a schematic diagram of an embodiment of the flexible thimble system of FIG. 5, where the flexible thimble system is a spring-loaded thimble system.

FIG. 7 is a schematic diagram of an embodiment of the thimble system 330 of FIG. 5, where the thimble system is a spring-loaded thimble system 350. In the illustrated embodiment, the spring-loaded thimble system 350 includes a spring-loaded thimble 351, the oxidant passageway 334, a spring system 352, an installation ramp 354 (e.g., tapered, curved, and/or angled guide or can), a support wall 356 (e.g., annular wall), a securing plate 358 (e.g., annular plate), and a retaining feature 361. In particular, the spring-loaded thimble system 350 (and more particularly the spring system 352 of the spring-loaded thimble system 350) provides flexibility and allows for a certain degree of movement along the axial direction 294 and/or the radial direction 296, as further described below. Further, the oxidant passageway 334 of the spring-loaded thimble system 350 is configured to provide a continuous and gap-less passageway (e.g., channel or conduit) for the oxidant 300 routed from the oxidant section 318 and into the oxidant mixing region 319 of the combustor chamber 168. In particular, the spring-loaded thimble 350 may not include any gaps that open to the passage 316. For example, the opposite ends (e.g., a first end 313 and a second end 315) of the oxidant passageway 334 may be fixed or sealed with the liner 308 and the flow sleeve 314, such that the passageway 334 is completely closed and sealed relative to the passage 316. In this manner, the spring-loaded thimble system 350 is configured to continuously route the oxidant 300 into the combustion chamber 168, while minimizing the amount of mixing and/or interaction between the oxidant 300 and the inert gas 304 in the passage 316. It should be noted that the arrangements described may be configured in the manner depicted and described, or in a reverse manner from what is depicted, such that the components coupled to the combustor liner 308 may be instead coupled to the flow sleeve 314 (and vise versa).

In certain embodiments, the installation ramp 354 of the spring-loaded thimble system 350 may be utilized when the combustor liner 308 is inserted into the flow sleeve 314 during installation. Specifically, the installation ramp 354 may allow the spring-loaded thimble system 350 to be installed within the combustor 160 even without any radial or axial gaps within the oxidant passageway 334 that may otherwise divide the thimble system 330. For example, in certain embodiments, the thimble system 330 does not include an axial gap to separate the thimble system 330 into a first half that is coupled to the flow sleeve 314 and a second half coupled to the combustor liner 308. Indeed, in the illustrated embodiment, the thimble system 330 is configured to provide a continuous oxidant passageway 334 that routes the oxidant 300 into the combustion chamber 168 from the oxidant section 318 without any interaction or mixing with the inert gas 304 in the passage 316. Furthermore, the installation ramp 354 may be utilized during the installation process when the combustor liner 308 is inserted in an axial direction 294 into the flow sleeve 314, as further described below.

In certain embodiments, the spring-loaded thimble 351 may include the oxidant passageway 334, which may be a cylindrical volume of space, an inner wall 360 (e.g., annular wall), and an outer wall 362. During installation of the spring-loaded thimble 351, the oxidant passageway 334, the inner wall 360, and the outer wall 362 may be disposed within the support wall 356. Specifically, in certain embodiments, the outer wall 362 may include a supporting protrusion 364 (e.g., annular protrusion or flange) that is configured to secure the outer wall 362 against the support wall 356. In particular, the support wall 356, the inner wall 360, the outer wall 362, and the supporting protrusion 364 may be configured to provide support for the spring-loaded thimble system 350 without restricting movement or flexibility. For example, in certain situations, the supporting protrusion 364 may enable small amounts of movement in the radial direction 296 against the support wall 356 due to various operating parameters of the combustion chamber 168. For example, the supporting protrusion 364 may move in the radial direction 296 to increase or decrease the offset distance 301 of the passage 316 between the combustor liner 308 and the flow sleeve 314. Further, the spring system 352 may be configured to provide the restoring force to bring the supporting protrusion 364, and thereby the spring-loaded thimble system 350, back to the original offset distance 301, such as the offset distance 301 between the flow sleeve 314 and the combustor liner 308 when the combustor 160 is assembled.

In certain embodiments, the support wall 356, the inner wall 360, the outer wall 362, and the spring system 352 may be disposed coaxially or concentrically with respect to one another, such that some movement and flexibility is provided. Further, in certain embodiments, one or more sleeves 363 are provided in a telescoping sleeve assembly, where each sleeve comprises the inner wall 360 and the outer wall 362. Specifically, the one or more sleeves 363 may be concentrically arranged to overlap, seal, extend, retract, and generally engage in telescopic movement relative to one another. The telescoping sleeve assembly may be disposed against the support wall 356 and the spring system 352 in the manner described above. In some embodiments, the spring loaded thimble 351 may have one sleeve 363 that extends from a second end 315 of the oxidant passageway 334 to the installation ramp 354, as illustrated by the phantom lines in FIG. 7.

Further, one or more components of the spring-loaded thimble system 350, such as the spring system 352, the securing plate 358, and the retaining feature 361, may also be arranged within the support wall 356. In particular, the securing plate 358 may be configured to secure the arrangement of the spring-loaded thimble system 350. For example, the securing plate 358 may be configured to axially secure the spring system 352 between the outer wall 362 and the support wall 356. Likewise, the retaining feature 361 may be configured to radially retain the spring-loaded thimble system 350 within the support wall 356 and within the flow sleeve 314. In should be noted that in certain embodiments, the retaining feature 361 may be disposed between the flow sleeve 314 and the combustor liner 308 and within the support wall 356. Further, in certain embodiments, the retaining feature 361 may be disposed on top of the flow sleeve 314 and the spring-loaded thimble system 350, and may be configured to radially retain the spring-loaded thimble system 350 within the flow sleeve 314. For example, in situations where the supporting protrusion 364 may engage in small amounts of movement in the radial direction 296 against the support wall 356, the retaining feature 361 may be configured to block the spring-loaded thimble system 350 from movement in the radial direction 296 past the flow sleeve 314. The retaining features may be any type of fasteners such as threaded fasteners, bolts, snap rings, support structures, welds, etc. that retain the arrangement and position of the spring-loaded thimble system 350.

Specifically, in certain embodiments, the installation ramp 354 may be coupled to the combustor liner 308. Further, the support wall 356 may be coupled to the flow sleeve 314. In certain embodiments, the installation ramp 354 and the support wall 356 may be coupled via welding, brazing, an adhesive, fasteners, etc. to the combustor liner 308 and the flow sleeve 314, respectively. In particular, the flow sleeve 314 coupled to the support wall 356 may be arranged first. Further, the spring system 352 and the outer wall 362 may be arranged such that the spring system 352 is disposed coaxial and in between the outer wall 362 and the support wall 356. As noted above, the securing plate 358 and the one or more retaining features 361 may be arranged within the support wall 356. In addition, in certain embodiments, the combustor liner 308 coupled to the installation ramp 354 may be inserted into the flow sleeve 314. In particular, the installation ramp 354 may be coupled to the flow sleeve 314 and oriented toward the turbine end portion 310 of the combustor 160. Further, the combustor liner 308 may be inserted into the flow sleeve 314 in the downstream direction 312, such that the installation ramp 354 is inserted into the flow sleeve 314 first. In this manner, the installation ramp 354 engages a bottom end 366 of the spring-loaded thimble system 350 first, and pushes the spring-loaded thimble system 350 in the radial direction 296 to load the spring-loaded thimble system 350. The spring system 352 may provide a restoring force against the installation ramp 354, thereby securing contact between the bottom end 366 of the spring-loaded thimble system 350 and the combustor liner 308 during operation of the combustor 160.

Figure 8:
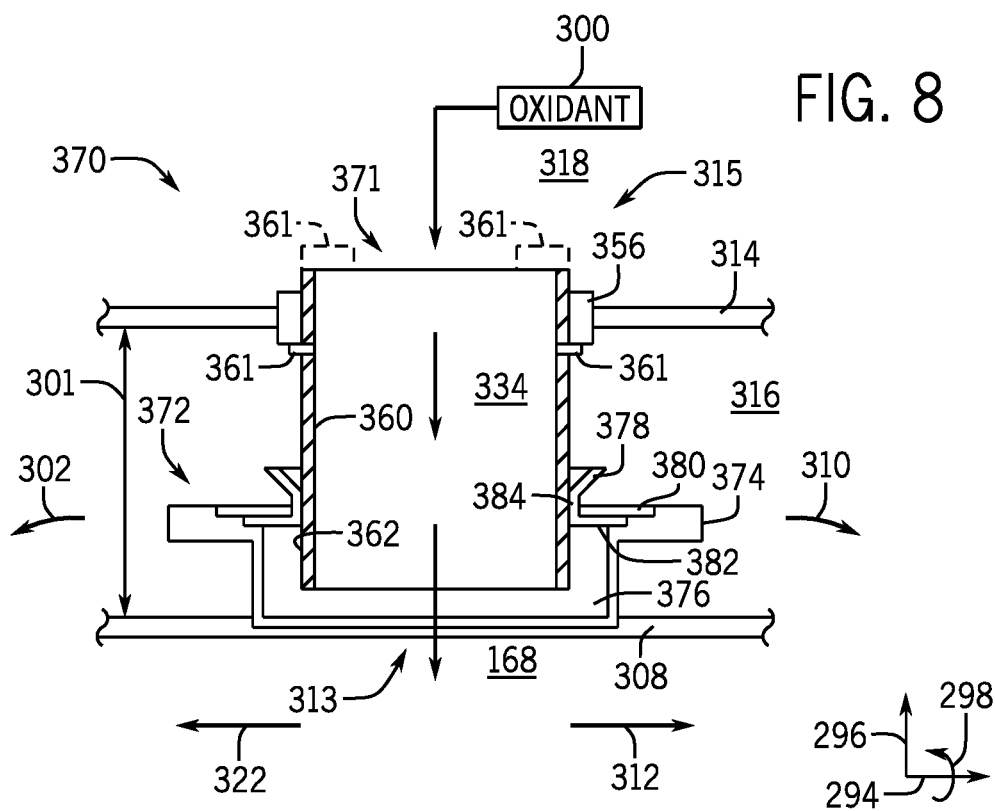
FIG. 8 is a schematic diagram of an embodiment of the flexible thimble system of FIG. 5, where the flexible thimble system is a mechanically-retained thimble system.

FIG. 8 is a schematic diagram of an embodiment of the thimble system 330 of FIG. 5, where the thimble system 330 is a mechanically-retained thimble system 370. In the illustrated embodiment, the mechanically-retained thimble system 370 includes a mechanically-retained thimble 371, the oxidant passageway 334, a floating collar 372 (e.g., annular collar), the support wall 356 coupled to the flow sleeve 314, one or more retaining features 361, the inner wall 360, and the outer wall 362. In the illustrated embodiment, the floating collar 372 may provide the mechanically-retained thimble system 370 with flexibility and may allow some movement along the axial direction 294 and/or the radial direction 296, as further described below. Further, the oxidant passageway 334 of the mechanically-retained thimble system 370 is configured to provide a continuous and substantially gap-less passageway (e.g., channel or conduit) for the oxidant 300 routed from the oxidant section 318 and into oxidant mixing region 319 of the combustor chamber 168. In particular, the mechanically-retained thimble system 370 may not include any gaps that open to the passage 316. For example, the opposite ends (e.g., a first end 313 and a second end 315) of the oxidant passageway 334 may be fixed or sealed with the liner 308 and the flow sleeve 314, such that the passageway 334 is completely closed and sealed relative to the passage 316. In this manner, the mechanically-retained thimble system 370 is configured to continuously route the oxidant 300 into the combustion chamber 168 while reducing or eliminating mixing and/or interaction between the oxidant 300 and the inert gas 304 in the passage 316. It should be noted that the arrangements described may be configured in the manner depicted and described, or in a reverse manner from what is depicted, such that the components coupled to the combustor liner 308 may be instead coupled to the flow sleeve 314 (and vise versa).

In certain embodiments, the floating collar 372 of the mechanically-retained thimble system 370 may be utilized during the installation process to assemble the mechanically-retained thimble system 370 between the flow sleeve 314 and the combustor liner 308. Specifically, the floating collar 372 may include an outer cup 374 that is coupled to the combustor liner 308. In certain embodiments, the outer cup 374 may be welded or otherwise securely fixed to the combustor liner 308. Further, a securing collar 378 (e.g., annular collar) may be disposed on the outer cup 374. In certain embodiments, this arrangement may be secured with a flat plate 380 (e.g., annular plate). In particular, the securing collar 378 may include a protruding portion 382 (e.g., annular flange) configured to engage the flat plate 380, and the outer cup 374. Further, the securing collar 378 may include a contact wall 384 (e.g., annular wall) configured to contact the outer wall 362. Further, a gap 376 may be disposed between the outer cup 372, the protruding portion 382, and the outer wall 362. However, it should be noted that the securing collar 378 may not be fixed or coupled to the outer wall 362, thereby enabling the mechanically-retained thimble 371 to move in the radial direction 296 relative to the securing collar 378 (e.g., along axis of collar 378).

Specifically, in certain embodiments, the floating collar 372 may be fixed or coupled to the combustor liner 308, and the support wall 356 may be fixed or coupled to the flow sleeve 314. In particular, during the installation process, the mechanically-retained thimble 371 may be inserted into the floating collar 372 in the radial direction 296. Specifically, the contact wall 384 of the supporting collar 378 may be configured to support the mechanically-retained thimble 371 as it is inserted into the retaining collar 378. In this manner, the floating collar 372 may be configured to provide support for the mechanically-retained thimble 371 without restricting the movement or flexibility of the mechanically-retained thimble system.

In certain embodiments, the support wall 356, the inner wall 360, and the outer wall 362 may be disposed coaxially or concentrically with respect to one another, such that some movement and flexibility is provided. Further, in certain embodiments, one or more sleeves are provided in a telescoping sleeve assembly, where each sleeve comprises the inner wall 360 and the outer wall 362. Specifically, the one or more sleeves may be concentrically arranged to overlap, seal, extend, retract, and generally engage in telescopic movement relative to one another. The telescoping sleeve assembly may be disposed against the support wall 356 and within the floating collar 372 in the manner described above.

Technical effects of the present approach include a thimble system 330 configured to direct and route the oxidant 300 flowing in the downstream direction 312 from the oxidant section 318 and into the oxidant mixing region 319 of the combustion chamber 168 of the combustor 160. In particular, the thimble system 330 may include the oxidant passageway 334 that directs the oxidant 300 from the oxidant section 318, through the combustor liner 308, and into the combustion chamber 168 of the combustor 160. In certain embodiments, the thimble system 330 includes the spring-loaded thimble system 350 that is configured to provide a continuous and substantially gap-less passageway for the oxidant 300 routed from the oxidant section 318 and into the combustor chamber 168. In certain embodiments, the thimble system 330 includes the mechanically-retained thimble system 370 that is configured to provide a continuous and substantially gap-less passageway for the oxidant 300 routed from the oxidant section 318 and into the combustor chamber 168. In particular, some embodiments of the spring-loaded thimble system 350 and the mechanically-retained thimble system 370 may not include any gaps that open to the passage 316. In this manner, the spring-loaded thimble system 350 and the mechanically-restrained thimble system 370 may be configured to continuously route the oxidant 300 into the combustion chamber 168 while reducing or eliminating mixing and/or interaction between the oxidant 300 and the inert gas 304 in the passage 316.

Additional Description

Embodiment 1

A system having a turbine combustor. The turbine combustor has a combustor liner disposed about a combustion chamber, a flow sleeve, and a radial passageway. The flow sleeve disposed at an offset about the combustor liner to define a passage, wherein the passage is configured to direct an exhaust gas flow toward a head end of the turbine combustor. The radial passageway extends between the flow sleeve and the combustor liner, and the radial passageway is configured to isolate an oxidant flow through the radial passageway from the exhaust gas flow through the passage for a first operating condition and a second operating condition of the turbine combustor. The offset between the combustor liner and the flow sleeve at the first operating condition is greater than the offset between the combustor liner and the flow sleeve at the second operating condition.

Embodiment 2

The system of embodiment 1, wherein the turbine combustor comprises a first fuel nozzle configured to direct a first fuel flow into the combustion chamber, and a second fuel nozzle configured to direct a second fuel flow into the combustion chamber, wherein the first fuel nozzle is controlled separately from the second fuel nozzle.

Embodiment 3

The system of embodiment 1, wherein the exhaust gas comprises less than approximately 5 percent by volume of the oxidant or fuel.

Embodiment 4

The system of embodiment 1, wherein a temperature of the combustor liner at the first operating condition is less than the temperature of the combustor liner at the second operating condition.

Embodiment 5

The system of embodiment 1, wherein the radial passageway includes a thimble system coupled to the flow sleeve and the combustor liner. The thimble system includes a thimble and a spring system configured to bias the thimble in a radial direction and enable a radial range of motion during operation of the turbine combustor.

Embodiment 6

The system of embodiment 5, wherein the combustor liner comprises an installation ramp configured to engage an end of the thimble to load gradually compress the spring system.

Embodiment 7

The system of embodiment 5, wherein the installation ramp gradually changes in height in an axial direction along the turbine combustor.

Embodiment 8

The system of embodiment 1, wherein the radial passageway includes a thimble system coupled to the flow sleeve and the combustor liner. The thimble system includes a thimble and a cup disposed about an end portion of the thimble.

Embodiment 9

The system of embodiment 1, comprising a gas turbine engine having the turbine combustor, a turbine driven by the combustion gases from the turbine combustor and that outputs an exhaust gas, and an exhaust gas compressor driven by the turbine, wherein the exhaust gas compressor is configured to compress and to route the exhaust gas to the turbine combustor.

Embodiment 10

The system of embodiment 9, wherein the gas turbine engine is a stoichiometric exhaust gas recirculation (SEGR) gas turbine engine.

Embodiment 11

The system of embodiment 9, comprising an exhaust gas extraction system coupled to the gas turbine engine and a hydrocarbon production system coupled to the exhaust gas extraction system.

Embodiment 12

A system including a thimble system configured to mount in a passage between a combustor liner and a flow sleeve of a turbine combustor of a gas turbine engine. The thimble system comprises at least one sleeve having an oxidant passage, and the at least one sleeve is configured to move between the combustor liner and the flow sleeve to block fluid communication between the oxidant passage and the passage.

Embodiment 13

The system of embodiment 12, wherein the thimble system is configured to expand and contract in a radial direction across the passage between the combustor liner and the flow sleeve.

Embodiment 14

The system of embodiment 12, wherein the at least one sleeve is spring-loaded by a spring.

Embodiment 15

The system of embodiment 12, wherein the at least one sleeve comprises a floating collar.

Embodiment 16

The system of embodiment 12, wherein the at least one sleeve comprises first and second sleeves in a nested arrangement.

Embodiment 17

The system of embodiment 16, wherein the first and second sleeves are configured to move telescopically relative to one another.

Embodiment 18

The system of embodiment 12, comprising the turbine combustor having the combustor liner, the flow sleeve, and the thimble system disposed in the passage between the combustor liner and the flow sleeve.

Embodiment 19

The system of embodiment 18, comprising the gas turbine engine having the turbine combustor.

Embodiment 20

The system of embodiment 19, wherein gas turbine engine comprises a turbine driven by combustion gases from the turbine combustor and that outputs an exhaust gas, and an exhaust gas compressor driven by the turbine, wherein the exhaust gas compressor is configured to compress and to route the exhaust gas to the turbine combustor, and the passage is configured to flow the exhaust gas between the combustor liner and the flow sleeve.

Embodiment 21

A method including adjustably routing an oxidant through an oxidant passage in a thimble system disposed in a passage between a combustor liner and a flow sleeve of a turbine combustor of a gas turbine engine. Adjustably routing comprises selectively moving at least one sleeve of the thimble system between the combustor liner and the flow sleeve while blocking fluid communication between the oxidant passage and the passage.

Embodiment 22

The method of embodiment 21, wherein selectively moving comprises expanding or contracting the thimble system in a radial direction across the passage between the combustor liner and the flow sleeve.

Embodiment 23

The method of embodiment 21, wherein selectively moving comprises spring biasing the at least one sleeve in a radial direction across the passage between the combustor liner and the flow sleeve.

Embodiment 24

The method of embodiment 21, wherein selectively moving comprises telescopically moving a first sleeve relative to a second sleeve of the at least one sleeve of the thimble system.

Embodiment 25

The method of embodiment 21 including driving a turbine of the gas turbine engine with combustion gases from the turbine combustor and outputting exhaust gas from the turbine. The method of embodiment 21 including recirculating the exhaust gas to a compressor of the gas turbine engine, compressing the exhaust gas in the compressor to generate compressed exhaust gas, routing the compressed exhaust gas through the passage between the combustor liner and the flow sleeve, and combusting a fuel with oxidant in the turbine combustor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
  a turbine combustor comprising:
    a combustor liner disposed about a combustion chamber;
    a flow sleeve disposed at an offset about the combustor liner to define a passage, wherein the passage is configured to direct an exhaust gas flow toward a head end of the turbine combustor; and
    a radial passageway extending radially between the flow sleeve and the combustor liner, wherein the radial passageway is configured to isolate an oxidant flow through the radial passageway from the exhaust gas flow through the passage for a first operating condition and a second operating condition of the turbine combustor, wherein the offset between the combustor liner and the flow sleeve at the first operating condition is greater than the offset between the combustor liner and the flow sleeve at the second operating condition, and wherein the radial passageway comprises:
      a thimble system coupled to the flow sleeve and the combustor liner, wherein the thimble system comprises:
        at least one sleeve configured to move between the combustor liner and the flow sleeve to isolate the oxidant flow from the exhaust gas flow, wherein a bottom end of the at least one sleeve is configured to contact a radially outer surface of the combustor liner within the radial passageway during operation of the combustor; and
        a spring system coaxial with the at least one sleeve and surrounding the at least one sleeve for at least a portion of the length of the at least one sleeve, the spring system having a first end configured to interface with a supporting protrusion extending from a cylindrical outer wall of the at least one sleeve, and the spring system having a second end coupled to a securing plate proximate the flow sleeve, the second end radially outward of the first end, wherein the spring system is disposed radially between the combustor liner and the flow sleeve, and wherein the spring system is configured to bias the at least one sleeve in a radial direction and enable a radial range of motion during operation of the turbine combustor to isolate the oxidant flow through the radial passageway from the exhaust gas flow through the passage.

2. The system of claim 1, wherein the turbine combustor comprises a first fuel nozzle configured to direct a first fuel flow into the combustion chamber, and a second fuel nozzle configured to direct a second fuel flow into the combustion chamber, wherein the first fuel nozzle is controlled separately from the second fuel nozzle.

3. The system of claim 1, wherein the exhaust gas flow comprises less than approximately 5 percent by volume of the oxidant or fuel.

4. The system of claim 1, wherein a temperature of the combustor liner at the first operating condition is less than the temperature of the combustor liner at the second operating condition.

5. The system of claim 1, wherein the combustor liner comprises an installation ramp configured to engage the bottom end of the at least one sleeve to gradually compress the spring system.

6. The system of claim 5, wherein the installation ramp gradually changes in height in an axial direction along the turbine combustor.

7. The system of claim 1, comprising a gas turbine engine having the turbine combustor, a turbine driven by the combustion gases from the turbine combustor and that outputs the exhaust gas flow, and an exhaust gas compressor driven by the turbine, wherein the exhaust gas compressor is configured to compress and to route the exhaust gas flow to the turbine combustor.

8. The system of claim 7, wherein the gas turbine engine is a stoichiometric exhaust gas recirculation (SEGR) gas turbine engine.

9. The system of claim 8, wherein the at least one sleeve comprises first and second sleeves in a nested arrangement.

10. The system of claim 9, wherein the first and second sleeves are configured to move telescopically relative to one another.

11. The system of claim 7, comprising an exhaust gas extraction system coupled to the gas turbine engine and a hydrocarbon production system coupled to the exhaust gas extraction system.

12. A system comprising:
a turbine combustor of a gas turbine engine, wherein the turbine combustor comprises a combustor liner disposed about a combustion chamber, a flow sleeve, and a passage radially between the combustor liner and the flow sleeve, and wherein the passage is configured to flow an exhaust gas of the turbine combustor; and
a thimble system configured to mount in the passage between the combustor liner and the flow sleeve of the turbine combustor of the gas turbine engine, wherein the thimble system comprises:
at least one sleeve defining an oxidant passage therethrough for oxidant to flow from radially outside the flow sleeve to inside the combustion chamber, wherein the at least one sleeve is configured to move radially between the combustor liner and the flow sleeve to block fluid communication between the oxidant passage and the passage; and
a spring coaxial with the at least one sleeve and surrounding the at least one sleeve for at least a portion of the length of the at least one sleeve, the spring having a first end configured to interface with a supporting protrusion extending from a cylindrical outer wall of the at least one sleeve, and the spring having a second end coupled to a securing plate proximate the flow sleeve, the second end radially outward of the first end, wherein the spring is disposed radially between the combustor liner and the flow sleeve, and wherein the spring is configured to radially bias the at least one sleeve toward the combustion liner such that a bottom end of the at least one sleeve is configured to directly contact a radially outer surface of the combustor liner within the passage during operation of the combustor.

13. The system of claim 12, wherein the thimble system is configured to expand and contract in a radial direction across the passage between the combustor liner and the flow sleeve.

14. The system of claim 12, comprising the gas turbine engine having the turbine combustor.

15. The system of claim 14, wherein the gas turbine engine comprises a turbine driven by combustion gases from the turbine combustor and that outputs the exhaust gas, and an exhaust gas compressor driven by the turbine, wherein the exhaust gas compressor is configured to compress and to route the exhaust gas to the turbine combustor, and the passage is configured to flow the exhaust gas between the combustor liner and the flow sleeve.

16. The system of claim 12, wherein the thimble system comprises a support wall disposed around the at least one sleeve and the spring.

17. A method comprising:
adjustably routing, during operation of a gas turbine engine, an oxidant through an oxidant passage in a thimble system disposed in a passage between a combustor liner and a flow sleeve of a turbine combustor of the gas turbine engine, the oxidant passage permitting the oxidant to flow from radially outside the flow sleeve to inside a combustion chamber within the combustion liner;
routing a compressed exhaust gas through the passage between the combustor liner and the flow sleeve;
wherein adjustably routing comprises selectively moving at least one sleeve of the thimble system radially between the combustor liner and the flow sleeve while blocking fluid communication between the oxidant passage and the passage, wherein selectively moving comprises spring biasing, via a spring, the at least one sleeve in a radial direction across the passage between the combustor liner and the flow sleeve, wherein the spring is coaxial with the at least one sleeve and is disposed around a cylindrical external surface of the at least one sleeve, the spring having a first end configured to interface with a supporting protrusion extending from the external surface of the at least one sleeve, and the spring having a second end coupled to a securing plate proximate the flow sleeve, the second end radially outward of the first end, and wherein spring biasing the at least one sleeve in the radial direction comprises directly contacting a bottom end of the at least one sleeve with a radially outer surface of the combustor liner.

18. The method of claim 17, wherein selectively moving comprises telescopically moving a first sleeve relative to a second sleeve of the at least one sleeve of the thimble system.

19. The method of claim 17, comprising:
driving a turbine of the gas turbine engine with combustion gases from the turbine combustor;
outputting an exhaust gas from the turbine;
recirculating the exhaust gas to a compressor of the gas turbine engine;
compressing the exhaust gas in the compressor to generate the compressed exhaust gas;

routing the compressed exhaust gas through the passage between the combustor liner and the flow sleeve; and combusting a fuel with the oxidant in the turbine combustor.

* * * * *